United States Patent [19]

Dijkmans et al.

[11] 4,234,763
[45] Nov. 18, 1980

[54] FEEDING BRIDGE WITH D.C.-COMPENSATION FOR BOTH DIRECTIONS OF THE FEED CURRENT

[75] Inventors: Eise C. Dijkmans; Barend Ijff, both of Eindhoven; Antonius H. J. Reuvekamp, Blantyre, all of Netherlands

[73] Assignee: U.S. Philips Corporation, New York, N.Y.

[21] Appl. No.: 55,844

[22] Filed: Jul. 9, 1979

[30] Foreign Application Priority Data

Jul. 19, 1978 [NL] Netherlands ..................... 7807706

[51] Int. Cl.³ ..................................... H04M 19/08
[52] U.S. Cl. ..................................... 179/77; 179/70; 179/18 FA
[58] Field of Search ............ 179/70, 77, 18 FA, 81 R, 179/18 F; 323/48, 57

[56] References Cited

U.S. PATENT DOCUMENTS

| | | | |
|---|---|---|---|
| 3,300,588 | 1/1967 | Flowers | 179/70 |
| 3,959,718 | 5/1976 | Hasegawa | 179/70 |
| 4,027,235 | 5/1977 | Macrander et al. | 179/18 FA |
| 4,056,691 | 11/1977 | Freimanis et al. | 179/18 FA |
| 4,087,647 | 5/1978 | Embree et al. | 179/77 |
| 4,088,843 | 5/1978 | Rogers et al. | 179/70 |
| 4,103,112 | 7/1978 | Korsky | 179/18 FA |
| 4,110,636 | 8/1978 | Diskmans | 179/70 |
| 4,167,654 | 9/1979 | Bolus et al. | 179/18 FA |
| 4,178,485 | 12/1979 | Cowpland et al. | 179/18 FA |

*Primary Examiner*—Gerald L. Brigance
*Attorney, Agent, or Firm*—Thomas A. Briody; William J. Streeter; Bernard Franzblau

[57] ABSTRACT

A bridge circuit comprising an isolation transformer having six primary windings which are connected so that the voice currents do and the supply currents do not generate, for either direction of current flow, a resulting flux in the core of the transformer. The bridge comprises two transistor circuits which prevent the voice currents from flowing through a supply source connected to the bridge and also balance the bridge circuit so that the influence of longitudinal noise signals which are produced in a transmission line connected to the bridge circuit are suppressed. The direction of the feed current in the transmission line can be reversed by means of the transistor circuits.

9 Claims, 4 Drawing Figures

FEEDING BRIDGE WITH D.C.-COMPENSATION FOR BOTH DIRECTIONS OF THE FEED CURRENT

The invention relates to a feeding bridge comprising a pair of terminals for connection to a transmission line, an isolation transformer having a first, a second, a third and a fourth primary winding with equal number of turns, each having a beginning and an end, a secondary winding and an isolating capacitor, one side of the capacitor being connected to the end of the first winding and being coupled to the end of the second winding, the other side of the isolating capacitor being connected to the beginning of the fourth winding and coupled to the beginning of the third winding, the beginning of the first winding and the end of the fourth winding being connected to the terminals, the beginning of the second winding being connected to a first terminal of a voltage source and the end of a third winding being connected to a second terminal of the voltage source, one side of the capacitor being coupled to a low-impedance input of a first transistor circuit through a first supply resistor and a first high-impedance output of the first transistor circuit being connected to the end of the second winding, the first transistor comprising a first control terminal, the other side of the capacitor being coupled through a second supply resistor to a low-impedance input of a second transistor circuit which is complementary to the first transistor circuit, a first high-impedance output of the second transistor circuit being connected to the beginning of the third winding and the second transistor circuit comprising a second control terminal.

Such a feeding bridge is disclosed in U.S. Pat. No. 4,110,636 and can be used in telecommunication exchanges having a central battery supply, such as telephone exchanges.

It is inter alia an object of this feeding bridge to protect the exchange from foreign influences from local exchange networks. This is realised by means of a transformer. The voice currents which flow in the transmission line pass through the first and the fourth winding of the transformer via the capacitor connected between these windings, which causes these currents to be transformed to the secondary winding. The feed current passes through all four windings which are connected two by two in the reverse direction so that the polarizing influence of the feedcurrent in the windings one and four on the core of the transformer is compensated for by the influence of the feedcurrent in the windings two and three. The first transistor circuit prevents the voice currents from flowing to the voltage source via the windings two and three.

In addition, the electric isolation obtained by means of the transformer makes it possible for marking voltages and hold currents of the telephone channel network to be selected independently of the supply voltage and the current in the subscriber's line.

Furthermore it is a property of the feeding bridge that the influence of the longitudinal noise signals produced on the transmission line is suppressed, which prevents these noise signals from being passed on to the exchange by the secondary winding.

However, this feeding bridge has the drawback that the direction of the current on the subscriber's line is limited to one value so that, inter alia, ringing by means of polarity reversal is not possible.

It is an object of the invention to extend said feeding bridge in a simple manner so that both directions of the current in the transmission line are possible and d.c. compensation for both directions is realised.

The bridge circuit according to the invention is therefore characterized in that the feeding bridge comprises a fifth and a sixth primary winding having a number of turns which is equal to the other primary windings. The beginning of the fifth winding is connected to a second terminal of the voltage source and the end of the fifth winding is connected to a second high-impedance output of the first transistor circuit and the first transistor circuit comprises a third control terminal. The end of the sixth winding is connected to the first terminal of the voltage source and the beginning of the sixth winding is connected to a second high-impedance output of the second transistor circuit and the transistor circuit comprises a fourth control terminal, means being present which are connected to the first, the second, the third and the fourth control terminal for reversing the direction of the current in the transmission line.

The invention will be further explained with reference to the embodiments shown in the drawing wherein the same reference symbols are used for the same or corresponding elements.

Figure 1:
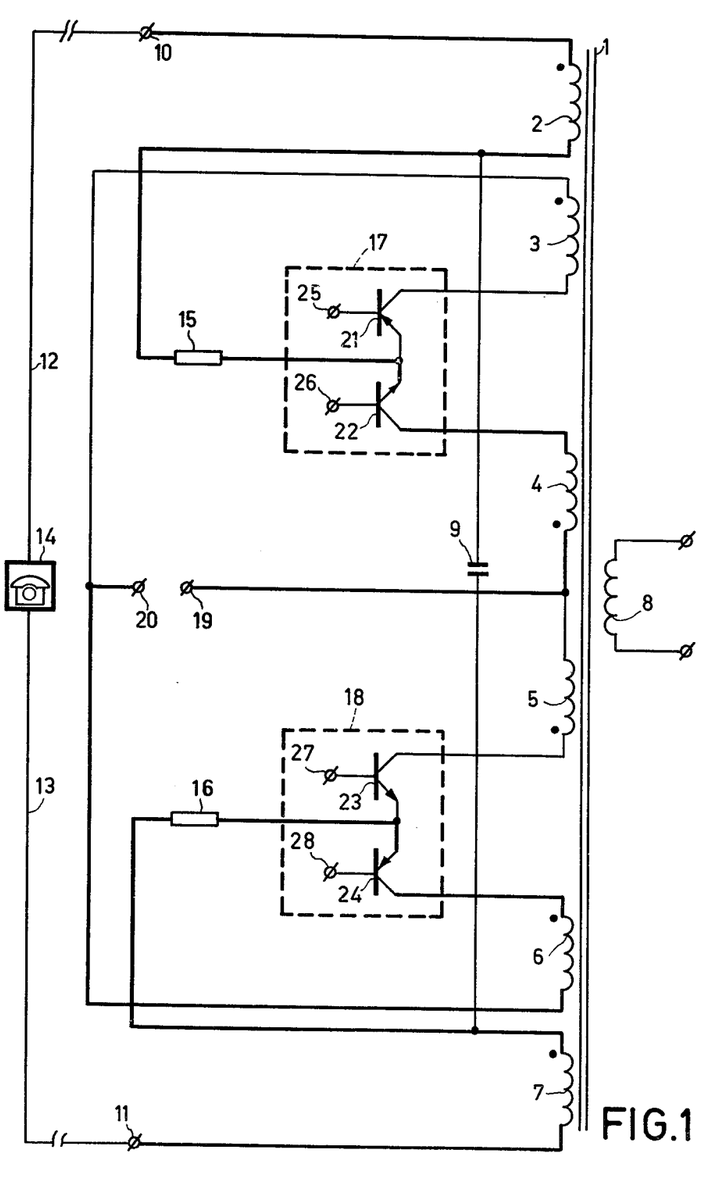
FIG. 1 shows a first embodiment of a feeding bridge according to the invention.

The feeding bridge shown in FIG. 1 comprises an isolation transformer 1 having six primary windings 2 to 7 inclusive each having the same number of turns and at least one secondary winding 8. An isolating capacitor 9 is arranged between the end of the first winding 2 and the beginning of the sixth winding 7. Two terminals 10 and 11 are connected to the beginning of the first winding 2 and to the end of the sixth winding 7, respectively. A subscriber's set 14 is connected to the terminals 10 and 11 through the wires 12 and 13 of a subscriber's line. A voice current supplied by the subscriber's set flows from the subscriber's set 14 through wire 12, terminal 10, the first winding 2, capacitor 9, the sixth winding 7, terminal 11 and wire 13 back to subscriber's set 14. The fluxes generated in the windings 2 and 7 by the voice currents have the same direction and induce in the secondary winding 8 a voltage which is proportional to these voice currents. The voice signals generated by the subscriber's set 14 are thus transferred through this feeding bridge to the exchange connected to the secondary winding 8.

In addition, this feeding bridge comprises a first transistor circuit 17 which is connected to the end of the second winding 3 and the end of the third winding 4 and a second transistor circuit 18 which is connected to the beginning of the fourth winding 5 and the beginning of the fifth winding 6. The first and second transistor circuits 17 and 18 are connected through supply resistors 15 and 16 to the end of the first winding 2 and the beginning of the sixth winding 7, respectively. The beginning of the third winding 4 and the end of the fourth winding 5 are connected to a first terminal 19 and the beginning of the second winding 3 and the end of the fifth winding 6 are connected to a second terminal 20. The supply current is produced by a voltage source which is connected between the terminals 19 and 20, which voltage source is connected to that terminal 20 carries a voltage which is more negative than the voltage at terminal 19.

In this embodiment the transistor circuit 17 comprises single transistors 21 and 22 which are complementary to one another and transistor circuit 18 also comprises single transistors 23 and 24 which are also complementary to one another. The collectors of these high-impedance transistors are connected to the end of the second winding 3, the end of the third winding 4, the beginning of the fourth winding 5 and the beginning of the fifth winding 6.

The emitters of the transistors 21 and 22 are interconnected to the first supply resistor 15 and the emitters of the transistors 23 and 24 are interconnected to the second supply resistor 16. The emitters of the transistors 21, 22, 23 and 24 have a low impedance. The bases of the transistors 21, 22, 23 and 24 are connected to the control terminals 25, 26, 27 and 28. The control terminals 25, 26 and 27, 28 are supplied in known manner with, for example, complementary square-wave signals, which ensures that transistors 21 and 23 are cutoff if transistors 22 and 24 are conductive and vice versa. In the case where transistors 21 and 23 are cutoff and consequently transistors 22 and 24 conduct, the d.c. feed current flows from terminal 19 through the third winding 4, transistor 22, the first supply resistor 15, the first winding 2, terminal 10, cable 12, subscriber's set 14 with closed switch-hook, cable 13, terminal 11, the sixth winding 7, the second supply resistor 16, transistor 24, the fifth winding 6 to terminal 20. The feed current flows through the windings 2, 4, 6, 7 in such a way that the fluxes generated in the windings 4 and 6 are opposite to those generated in the windings 2 and 7 and, owing to the equal number of turns, the fluxes generated by the feed currents in the winding 2 and 7 are compensated by those in the windings 4 and 6. This feed current path is indicated in FIG. 1 by means of a bold line.

However, here the direction of the direct current in the subscriber's line is not limited to the direction of the current path indicated by the bold line. In the case where the transistors 21 and 23 conduct and, consequently, the transistors 22 and 24 are cutoff, the complementary situation occurs. The feed direct current in the subscriber's line has reversed its direction. In this case the flux generated in the windings 2 and 7 are compensated for by the windings 3 and 5. Besides the advantage that the direction of the feed direct current in the subscriber's line can be reversed in a simple manner, the advantage is maintained that an isolation transformer having a comparatively small core is sufficient.

It should be noted that a ringing signal and metering pulses can be added by including a signal source, for example in the form of a transformer, in series with the first supply resistor 15 and the second supply resistor 16.

The high impedances of the collectors of the transistors 21, 22, 23 and 24 prevent the voltages induced in the windings 4 and 6 or 3 and 5 by the voice current flowing in the windings 2 and 7 from causing a current to flow via the voltage source, so that the speech signals in this feeding bridge are not additionally attenuated.

The low-ohmic impedance of the emitters of the transistors 21, 22, 23 and 24 have the advantage that voltages which are produced as a result of a longitudinal noise signal are limited in the feeding bridge.

Figure 2:
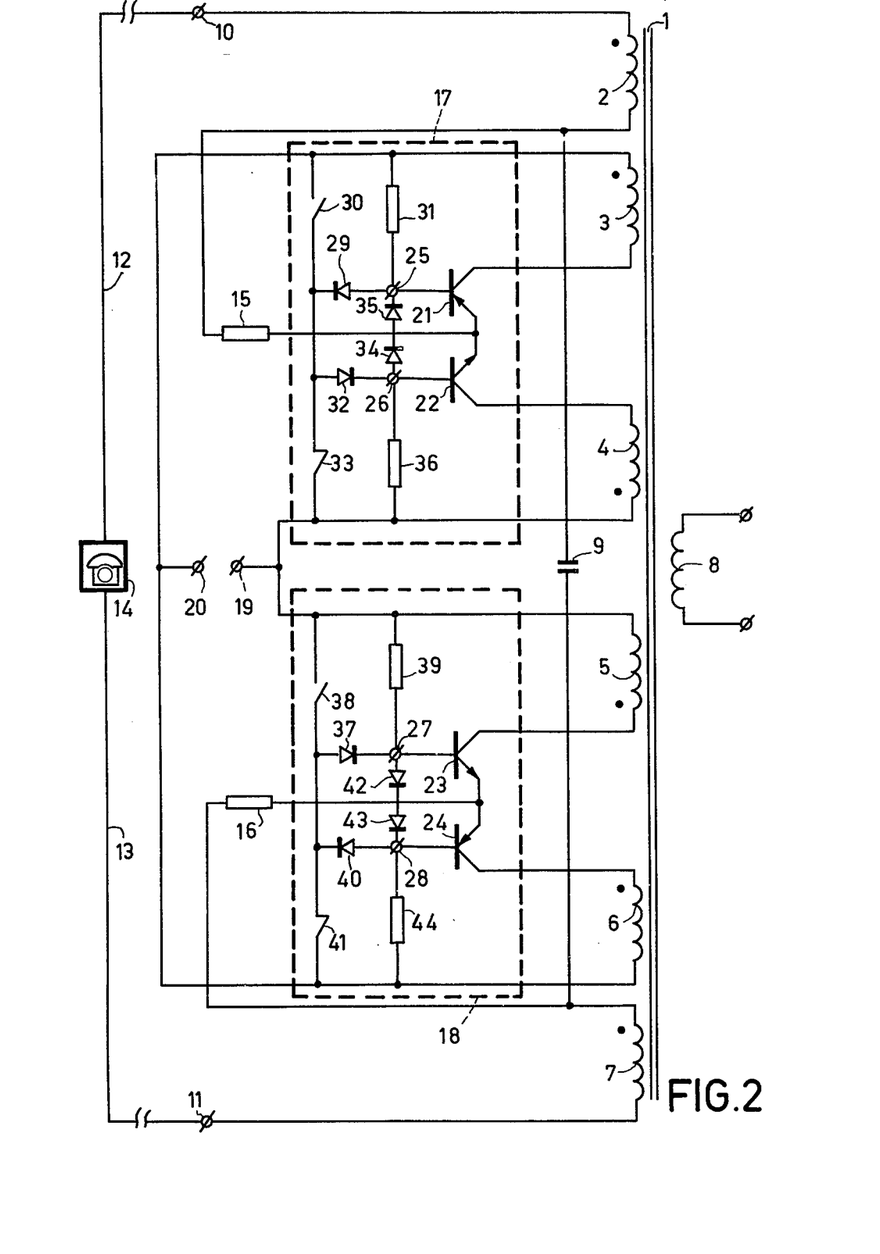
FIG. 2 shows a second embodiment of a feeding bridge according to the invention.

FIG. 2 shows a second embodiment according to the invention and shows in greater detail how the control signals can be realised. To this end control terminal 25 of the first transistor circuit 17 is connected to the second terminal 20 through a first diode 29 and a first switch 30, which is shown in the drawing in the open state. Furthermore, control terminal 25 is connected to the second terminal 20 through a first resistor 31. Control terminal 26 is connected to the first terminal 19 through a second diode 32 and a switch 33, which is complementary to switch 30. Furthermore, control terminal 26 is connected to control terminal 25 through third and fourth series-arranged diodes 34 and 35 and to the first terminal 19 through a second resistor 36. The common junction of diode 29 and switch 30 is connected to the common junction of diode 32 and switch 33. Strictly speaking this connection is superfluous but is introduced because then a practical four-diodes-in-one envelope, a so-called Graetz circuit, can be used. The diodes are oriented as shown in the figure.

The first diode 29 and the second diode 32 serve to prevent the transistors 21 and 22, respectively, from being driven to the saturation state by the alternating currents flowing in the windings 3 and 4, respectively, included in the collector lead. Diodes 34 and 35 form, together with the resistors 31 and 36, a current setting for the transistors 21 and 22.

The first transistor circuit 17 operates as follows. If the switches 30, 33 are in the position shown in the drawing, the emitter potential of npn transistor 22 is lower than the base potential so that the transistor 22 will conduct. The emitter potential of pnp transistor 21 is higher than the base potential so that the transistor 21 will be cutoff. The feed current will be able to flow from the third winding 4 to the first winding 2 via transistor 22 and the first supply resistor 15. If switch 30 is closed and switch 33 is opened then transistor 21 will conduct and transistor 22 will be cutoff. Now the feed current will flow from the first winding 2 to the second winding 3 through the first supply resistor 15 and transistor 21. In this case the feed current in the subscriber's line has a direction which is the reverse of that described for the previous case.

Control terminal 27 of the second transistor circuit 18 is connected to the firsst terminal 19 through a diode 37 and a third switch 38 which is shown in the drawing in the open state. In addition, control terminal 27 is also connected to the first connecting terminal 19 through a third resistor 39. Control terminal 28 is connected to the second terminal 20 through a sixth diode 40 and a switch 41 which is complementary to switch 38. In addition, control terminal 28 is connected to control terminal 27 through seventh and eighth series-arranged diodes 42 and 43, and to the second terminal 20 through a fourth resistor 44. The common junction of diode 37 and switch 38 is connected to the common junction of diode 40 and switch 41. The second transistor circuit 18 operates in exactly the same manner as the first transistor circuit 17.

The total feeding bridge operates as follows:

In the positions shown in the drawing of the switches 30, 33, 38 and 41 the feed current will flow from the first terminal 19, through a third winding 4, transistor 22, first supply resistor 15, first winding 2, terminal 10 and through cable 12 to the subscriber's set 14 and through cable 13, terminal 11, sixth winding 7, second supply resistor 16, transistor 24, and through fifth winding 6 to the second terminal 20. If the switches 30 and 38 are closed and switches 33 and 41 are opened the feedcurrent in the subscriber's line reverses its direction because the transistors 21 and 23 conduct and the transistors 22 and 24 are cutoff. This circuit has the advantage that by opening and closing the switches 30 and 38 and 33 and 41 pair-wise the direction of the subscriber's direct current can be reversed in a simple manner and d.c. compensation is realized for both directions.

Figure 3:
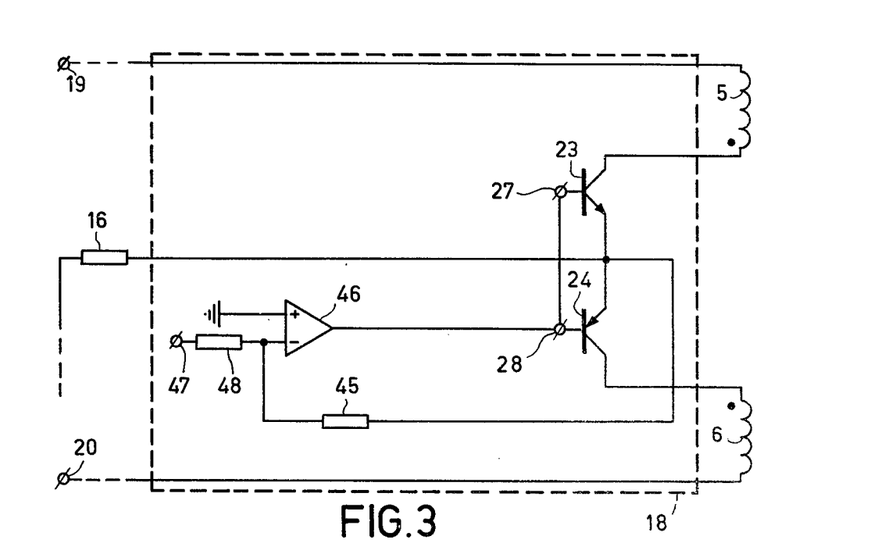
FIG. 3 shows a first embodiment of a transistor circuit for the feeding bridge according to the invention shown in FIG. 1.

The junction voltages of transistors 21 and 22 and diodes 34 and 35 of transistor circuit 17 must be equal to one another to prevent a transient of the emitter potential of transistors 21 and 22 from occurring when the direction is reversed. This also holds for transistor circuit 18. FIG. 3 shows an embodiment of a transistor circuit wherein this problem is obviated by the use of an operational amplifier in the feedback path.

FIG. 3 shows a first embodiment of the second transistor circuit 18 for use in a feeding bridge shown in FIG. 1. The first transistor circuit 17 is arranged in a corresponding manner. The emitters of the transistors 23 and 24 are connected to the inverting input of an operational amplifier 46 through a resistor 45. The noninverting input of the operational amplifier 46 is connected to ground potential. The output of the operational amplifier 46 is connected to control terminals 27 and 28. The emitter potential of the transistors 23 and 24 is negatively fed back by the operational amplifier 45 so that the transient of the emitter potential is reduced very strongly (reduction factor $1/(1+\beta A)$, A being the open-loop gain of the operational amplifier and $\beta$ being the ratio of the values of resistor 48 to the sum of resistor 48 and resistor 45). In addition, the operational amplifier 46 makes it possible to connect a voltage source having a voltage $V_i$, to terminal 47 which voltage source is coupled to the inverting input through the resistor 48. Then the feed potential can be adjusted proportionally to $V_i$. For example, with a ratio of the resistors 45 and 48 of 10:1 and a voltage of $+V_B$ at terminal 19 and a voltage of $-V_B$ at terminal 20 the potential of the common emitter junction of transistors 23 and 24 will vary between approximately $-V_B$ and $V_B$ if $V_i$ varies from $+V_B/10$ to $-V_B/10$.

This circuit has the advantage that the possible transient in the emitter potential which occurs when the direction of the current is reversed is very strongly reduced.

In the transistor circuit 18 shown in FIG. 3 the operational amplifier 46 is at the same time an inverting amplifier. It is, however, alternatively possible to use the operational amplifier 46 as a non-inverting amplifier.

Figure 4:
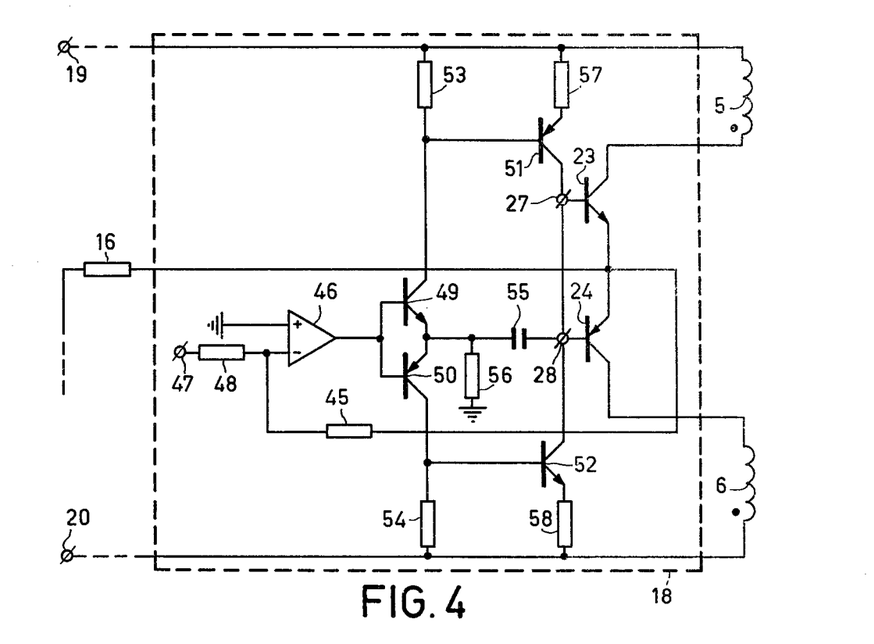
FIG. 4 shows a second embodiment of a transistor circuit for the feeding bridge according to the invention shown in FIG. 1.

If the supply voltages to be used are higher than permissible for the operational amplifiers used in the transistor circuits 17 and 18 of FIG. 3, a circuit as shown in FIG. 4 can be used.

FIG. 4 shows another embodiment of the second transistor circuit 18. The first transistor circuit 17 is arranged in a corresponding manner. An amplifier stage including the transistors 49, 50, 51 and 52 has been included after the operational amplifier 46. The bases of the transistors 49 and 50 are interconnected to the output of the operational amplifier 46. The collector of transistor 49 is connected to the first terminal 19 through a resistor 53 and to the base of transistor 51. The collector of transistor 50 is connected to the second terminal 20 through a resistor 54 and to the base of transistor 52. The emitters of the transistors 49 and 50 are interconnected to the control terminal 28 through a capacitor 55 and to ground through a resistor 56. The emitter of transistor 51 is connected to the first terminal 19 through a resistor 57 and the collector of transistor 51 is connected to control terminal 27 and to control terminal 28. The emitter of transistor 52 is connected to the second terminal 20 through a resistor 58 whereas its collector is connected to control terminal 28. The circuit operates as follows. The transistors 49 and 50 serve as voltage/current converters, either transistor 49 conducting and transistor 50 being cutoff, or transistor 50 being conductive and transistor 49 being cutoff. Owing to the current in the collector lead of transistor 49 or 50 the resulting voltage drop across resistor 53 or 54 will cause transistor 51 or transistor 52 to conduct. Thereafter, the collector potential of the transistors 51, 52 determines which of the two transistors 23 and 24 will conduct. The gain of the amplifier stage formed by the transistors 49 or 50 is determined by the ratio of the values of resistors 53 and 56 or 54 and 56 and the gain of the transistors 51 or 52 is determined by the ratio of the impedance at the collectors of the transistors 51 or 52 and the value of resistors 57 or 58. The gain for higher frequencies is reduced to unity by the coupling capacitor 55. As the output voltage at the emitters of transistors 23 and 24 is independent of the supply voltage of the operational amplifier 46, the supply voltage which is connected to the first and the second terminals 19 and 20 can be temporarily increased or decreased, respectively. If a ringing signal of a metering signal is then applied to terminal 47, the ringing signal or the metering signal will then be produced at the output, that is to say at the emitters of the transistors 23 and 24. This has the advantage that the transformer which otherwise would be included in series with the first and the second supply resistors 15 and 16 for the introduction of the ringing and metering signals can then be dispensed with.

It should be noted that the transistor circuits 17 and 18 are not limited to the implementation shown in the embodiments of FIGS. 1, 2, 3 and 4, but that they may, for example, also comprise a Darlington circuit or a MOSFET etc.

What is claimed is:

1. A bridge circuit comprising, a pair of terminals for connection to a transmission line, an isolation transformer having a secondary winding and first, second, third, fourth, fifth and sixth primary windings each having the same number of turns and each having a beginning and an end, an isolating capacitor, means connecting one terminal of the capacitor to the end of the first winding, means connecting the other terminal of the isolating capacitor to the beginning of the sixth winding, means connecting the beginning of the first winding and the end of the sixth winding to said terminals, means connecting the beginning of the second winding to a first terminal of a voltage source and the beginning of the third winding to a second terminal of the voltage source, means coupling said one terminal of the capacitor to a low-impedance input of a first transistor circuit via a first supply resistor, means connecting a first high-impedance output of the first transistor circuit to the end of the second winding, the first transistor circuit having a first control terminal, means coupling said other terminal of the capacitor through a second supply resistor to a low-impedance input of a second transistor circuit which is complementary to the first transistor circuit, means connecting a first high-impedance output of the second transistor circuit to the beginning of the forth winding, the second transistor circuit having a second control terminal, means connecting the end of the fifth winding to the first terminal of the voltage source and the beginning of the fifth winding to a second high-impedance output of the second transistor circuit, the first transistor circuit having a third control terminal, means connecting the end of the sixth winding to one terminal of the pair of terminals and the beginning of the sixth winding to said low-impedance input of the second transistor circuit, the second transistor circuit having a fourth control terminal, and means connected to the first, second, third and fourth control terminals for controlling the operation of said first and second transistor circuits so as to reverse the direction of current in the transmission line.

2. A bridge circuit as claimed in claim 1 wherein said controlling means comprises, means connecting the first terminal of the voltage source to the second terminal of the voltage source via a series arrangement of a first switch, a first diode network and a second switch, means coupling the first diode network to the first control terminal and to the third control terminal, means connecting the first terminal of the voltage source to the second terminal thereof via a second series arrangement including a third switch, a second diode network and a fourth switch, means coupling the second diode network to the second and the fourth control terminals, the switches being selectively operable to generate control signals for reversing the direction of current in the transmission line.

3. A bridge circuit as claimed in claim 1 wherein the first transistor circuit further comprises a first operational amplifier which has a first inverting input, a second non-inverting input and an output, means coupling said amplifier output to the first and third control terminals and the first input of the operational amplifier to the input of the first transistor circuit, and wherein the second transistor circuit further comprises a second operational amplifier which has a first inverting input, a second non-inverting input and an output, means coupling the amplifier output to the second and fourth control terminals and the first input of the second operational amplifier to the input of the second transistor circuit, said first and second operational amplifiers being operable to reduce the voltage transient occurring when the current direction in the transmission line is reversed.

4. A bridge circuit as claimed in claim 3 further comprising means connecting the ouput of the operational amplifier of the first transistor circuit to the input of a first amplifier and the output of the first amplifier to the first and third control terminals, means connecting the output of the operational amplifier of the second transistor circuit to the input of a second amplifier and the output of the second amplifier to the second and fourth control terminals, and means connecting the first and the second amplifier to the first and second terminals of the voltage source to drive the input of the first and the second transistor circuit at a level which is not more than equal to the value of the voltage source and which is independent of the operational amplifier supply voltage.

5. Apparatus for coupling a pair of input terminals to a pair of output terminals comprising, a transformer having six primary windings each with the same number of turns and a second winding coupled to the output terminals, a capacitor, first and second complementary transistor circuits each having a pair of control terminals, first and second impedance elements, means serially connecting a first primary winding, the capacitor and a sixth primary winding of the transformer across the input terminals with the first and sixth windings polarized in the same sense, first and second supply terminals for connection to a source of voltage, means serially connecting a third primary winding of the transformer, a first part of the first transistor circuit, the first impedance element and said first primary winding of the transformer between said first supply terminal and a first one of said input terminals and with said first and third windings polarized in the opposite sense, means serially connecting a fourth primary winding, a first part of the second transistor circuit, the second impedance element and said sixth primary winding between said first supply terminal and a second one of said input terminals and with said fourth and sixth windings polarized in the opposite sense, means serially connecting a second primary winding of the transformer, a second part of the first transistor circuit, said first impedance element and the first primary winding between the second supply terminal and the first input terminal, means serially connecting a fifth primary winding of the transformer, a second part of the second transistor circuit, the second impedance element and the sixth primary winding between the second supply terminal and the second input terminal, and means for applying control signals to the control terminals of said first and second transistor circuits to control the operation thereof so as to reverse the direction of current flowing from said supply terminals to said input terminals.

6. An apparatus as claimed in claim 5 wherein said supply terminals are adapted for connection to a source of D.C. voltage and said input terminals are adapted to be connected to a transmission line of a telephone system.

7. An apparatus as claimed in claims 5 or 6 wherein said first and second parts of said first and second transistor circuits each comprise first and second complementary transistors having emitter electrodes connected together and to respective ones of said first and second impedance elements.

8. An apparatus as claimed in claims 5 or 6 wherein said transformer includes a magnetic core on which the six primary windings are wound with said first, second, fifth and sixth windings wound in the same sense and the third and fourth windings wound in opposite sense to the first, second, fifth and sixth windings.

9. An apparatus as claimed in claims 5 or 6 wherein said control signal applying means comprises, first, second, third and fourth switches, first and second diode networks, means serially connecting said first switch, said first diode network and said second switch between the first and second supply terminals, means coupling the first diode network to the control terminals of the first transistor circuit, means serially connecting the third switch, said second diode network and the fourth switch between the first and second supply terminals, and means coupling the second diode network to the control terminals of the second transistor circuit, said switches being operable in pairs to produce control signals for operating the first and second transistor circuits so as to provide said reverse directions of current flow.

* * * * *

UNITED STATES PATENT OFFICE
CERTIFICATE OF CORRECTION

Patent No. 4,234,763            Dated November 18, 1980

Inventor(s)  Eise C. Dijkmans et al

It is certified that error appears in the above-identified patent and that said Letters Patent are hereby corrected as shown below:

On the Title Page, under Inventors, item [75] should read as follows:

-- Eise C. Dijkmans; Barend Ijff, both of Eindhoven, Netherlands; Antonius H.J. Reuvekamp, Blantyre, Malawi--

In the Specifications:

Col. 2, line 5, After "invention" insert

--comprises, a pair of line terminals, an isolation transformer having first through sixth primary windings each with the same number of turns, an isolating capacitor having one terminal connected to the end of the first winding and another terminal connected to the beginning of the sixth winding, means connecting the beginning of the first winding and the end of the sixth winding to said line terminals, means connecting the beginning of the second winding and the beginning of the third winding to

UNITED STATES PATENT OFFICE
CERTIFICATE OF CORRECTION

Patent No. 4,234,763             Dated November 18, 1980

Inventor(s) Eise C. Dijkmans et al

It is certified that error appears in the above-identified patent and that said Letters Patent are hereby corrected as shown below:

> first and second terminals, respectively,
> of a voltage source, first and second
> complementary transistor circuits having
> first and second control terminals, re-
> spectively, means coupling said one ter-
> minal of the capacitor to a low-impedance
> input of the first transistor circuit via
> a first supply resistor, means connecting
> a first high-impedance output of the first
> transistor circuit to the end of the second
> winding, means coupling the other capacitor
> terminal through a second supply resistor
> to a low-impedance input of the second
> transistor circuit, and means connecting
> a first high-impedance output of the second
> transistor circuit to the beginning of the
> fourth winding. The bridge circuit --

Col. 2, lines 5 & 6,  Delete "therefore"

Col. 2, line 6,  Delete "feeding bridge comprises"

UNITED STATES PATENT OFFICE
CERTIFICATE OF CORRECTION

Patent No. 4,234,763  Dated November 18, 1980

Inventor(s) Eise C. Dijkmans et al

It is certified that error appears in the above-identified patent and that said Letters Patent are hereby corrected as shown below:

Col. 2, lines 7 & 8, Delete " a fifth and a sixth primary winding having a number of turns which is equal to the other primary windings. The "

Col. 2, line 9, Change "beginning" to --end--

Col. 2, line 9, Change "a second" to --the first--

Col. 2, line 10, Change "end" to --beginning--

Col. 2, line 13, Change "first" (first occurrence) to -- second--

Col. 2, line 14, Delete "the first" and insert -- one --

Col. 2, line 15, Delete "voltage source" and insert -- pair of terminals --

UNITED STATES PATENT OFFICE
CERTIFICATE OF CORRECTION

Patent No. 4,234,763    Dated November 18, 1980

Inventor(s) Eise C. Dijkmans et al

It is certified that error appears in the above-identified patent and that said Letters Patent are hereby corrected as shown below:

Col. 2, line 16, Delete "second high" and insert -- low --

Col. 2, line 16, Change "output" to --input--

Col. 2, line 17, Before "transistor" (second occurrence) insert -- second --

Col. 2, lines 18 & 19, After "terminal" delete ", means being present which are"

Col. 2, line 20, Change "terminal" to -- terminals --

Col. 3, line 5, Change "to" to --so--

UNITED STATES PATENT OFFICE
CERTIFICATE OF CORRECTION

Patent No. 4,234,763      Dated November 18, 1980

Inventor(s) Eise C. Dijkmans et al

It is certified that error appears in the above-identified patent and that said Letters Patent are hereby corrected as shown below:

In the Claims:

Col. 7, line 40, Before "amplifier" insert

-- second operational --

Col. 7, line 57, Change "input" to --inputs--

Col. 7, line 58, Change "circuit" to --circuits--

Signed and Sealed this

Ninth Day of June 1981

[SEAL]

Attest:

RENE D. TEGTMEYER

Attesting Officer      Acting Commissioner of Patents and Trademarks

UNITED STATES PATENT AND TRADEMARK OFFICE
CERTIFICATE OF CORRECTION

PATENT NO. : 4,234,763
DATED : Nov. 18, 1980
INVENTOR(S) : EISE C. DIJKMANS et al

It is certified that error appears in the above-identified patent and that said Letters Patent are hereby corrected as shown below:

Col. 2, Line 18, after "terminal" insert
-- . And means --

Signed and Sealed this

Sixth Day of October 1981

[SEAL]

Attest:

Attesting Officer

GERALD J. MOSSINGHOFF

Commissioner of Patents and Trademarks